(12) United States Patent
Sakai et al.

(10) Patent No.: US 9,093,857 B2
(45) Date of Patent: Jul. 28, 2015

(54) MOBILE DEVICE AND CHARGING APPARATUS

(71) Applicant: SONY MOBILE COMMUNICATIONS JAPAN, INC., Tokyo (JP)

(72) Inventors: Daisuke Sakai, Tokyo (JP); Kuniharu Suzuki, Tokyo (JP); Katsuya Suzuki, Gunma (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 415 days.

(21) Appl. No.: 13/654,478

(22) Filed: Oct. 18, 2012

(65) Prior Publication Data

US 2013/0154554 A1   Jun. 20, 2013

Related U.S. Application Data

(60) Provisional application No. 61/577,697, filed on Dec. 20, 2011.

(51) Int. Cl.
*H02J 7/00* (2006.01)
*H02J 7/02* (2006.01)
*H02J 5/00* (2006.01)

(52) U.S. Cl.
CPC .............. *H02J 7/025* (2013.01); *H02J 7/0027* (2013.01); *H02J 7/0044* (2013.01); *H02J 5/005* (2013.01)

(58) Field of Classification Search
USPC ......................................................... 320/108
See application file for complete search history.

(56) References Cited

U.S. PATENT DOCUMENTS

2008/0258688 A1\* 10/2008 Hussain et al. ............... 320/145
2009/0072788 A1\* 3/2009 Delaille et al. ............... 320/124

FOREIGN PATENT DOCUMENTS

JP          2008-236968          10/2008
JP          4480048 B2           6/2010

OTHER PUBLICATIONS

U.S. Appl. No. 13/673,122, filed Nov. 9, 2012, Suzuki, et al.

\* cited by examiner

*Primary Examiner* — Samuel Berhanu
(74) *Attorney, Agent, or Firm* — Oblon, McClelland, Maier & Neustadt, L.L.P.

(57) ABSTRACT

When the charge level of a fully-charged rechargeable battery decreases due to quiescent power drain, in order to recharge it is necessary for the user to pick up and again place the mobile device in which the rechargeable battery is inserted onto a charging apparatus and issue instructions to start recharging. To address this issue, a charging controller applies control to disconnect a capacitor from a receiver coil with a switch in the case where the charge level of a rechargeable battery is equal to or greater than a given threshold value, and additionally applies control to connect the capacitor to the receiver coil with the switch in the case where the charge level of the rechargeable battery is less than the threshold value.

14 Claims, 13 Drawing Sheets

| RECHARGEABLE BATTERY CHARGE LEVEL | SWITCH STATE |
|---|---|
| 90-100% | DISCONNECT |
| 80-89% | CONNECT C1 |
| 70-79% | CONNECT C2 |
| 0-69% | CONNECT C3 |

CAPACITANCE: C1 < C2 < C3

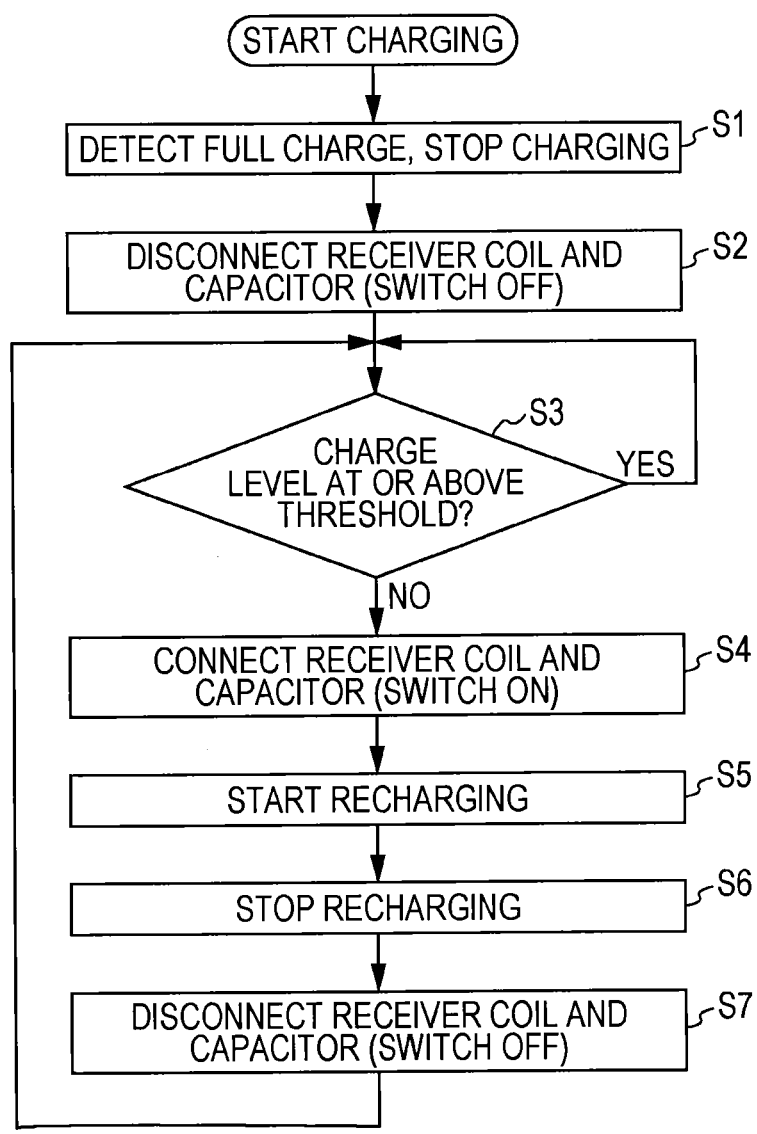

| RECHARGEABLE BATTERY CHARGE LEVEL | SWITCH STATE |
|---|---|
| 90-100% | DISCONNECT |
| 80-89% | CONNECT C1 |
| 70-79% | CONNECT C2 |
| 0-69% | CONNECT C3 |

CAPACITANCE: C1 < C2 < C3

| RECHARGEABLE BATTERY CHARGE LEVEL | PRIORITY SETTING | SWITCH STATE |
|---|---|---|
| 80-100% | — | DISCONNECT |
| LESS THAN 80% | 3 | CONNECT C1 |
| | 2 | CONNECT C2 |
| | 1 | CONNECT C3 |

CAPACITOR SIZE: C1 < C2 < C3

FIG. 15A

| CHARGE LEVEL | CHARGE LEVEL-DEPENDENT CAPACITOR STATE |
|---|---|
| 90% OR MORE | DISCONNECT |
| 80-89% | CONNECT 10nF |
| 60-79% | CONNECT 20nF |
| LESS THAN 60% | CONNECT 30nF |

FIG. 15B

| PRIORITY SETTING | PRIORITY-DEPENDENT CAPACITOR STATE |
|---|---|
| NOT SET | DISCONNECT |
| 1 | CONNECT 8nF |
| 2 | CONNECT 5nF |
| 3 | CONNECT 3nF | ced
MOBILE DEVICE AND CHARGING APPARATUS

CROSS-REFERENCE TO RELATED APPLICATIONS

The present application is based on and claims the benefit of priority to U.S. Application No. 61/577,697, filed Dec. 20, 2011, the entire contents of which are incorporated herein by reference.

TECHNICAL FIELD

The present disclosure relates to a mobile device that issues instructions to start charging to a charging apparatus which wirelessly charges a rechargeable battery, and also relates to a charging apparatus.

BACKGROUND ART

Hitherto, there have been proposed a charging apparatus able to charge a rechargeable battery in a battery pack inserted into a mobile phone or other information processing device by using a standardized wireless power format.

At this point, exemplary operation of a conventional charging apparatus will be described with reference to FIG. 17.

FIG. 17 illustrates how a conventional charge pad 102 charges a mobile device 101.

A flat charge pad 102 used as a charging apparatus is provided with a thin, plate-shaped receptacle 103 and is able to receive power from a power supply apparatus not illustrated and wirelessly charge a rechargeable battery provided in a mobile device 101 placed on the receptacle 103. Herein, "wirelessly" refers to the mobile device 101 and the charge pad 102 being able to exchange power, signals, etc. while in a state of not being directly electrically connected via coils respectively provided therein.

In the charge pad 102, a transmitter coil 104 is provided inside the receptacle 103. When a coil for position detection disposed with the receptacle 103 overlaid detects the position where the mobile device 101 was placed, the transmitter coil 104 approaches the mobile device 101 placed on the receptacle 103 and charges a rechargeable battery. The technique of a transmitter coil 104 inside a receptacle 103 moving to charge a mobile device 101 is called the "moving coil technique".

Meanwhile, technology related to a charger that wirelessly charges electronic devices is disclosed in PTL 1. With this technology, the intervals between the generation times of a signal that checks if an electronic device has been placed on the charger in a chargeable state and a command that checks if an electronic device has requested a recharge are made to differ, and a recharge is conducted if there is a decrease in the charge level of a rechargeable battery provided in an electronic device which has finished charging.

Also, technology that determines to stop or continue transmitting power to a primary coil according to the value of a detection current is disclosed in PTL 2.

CITATION LIST

Patent Literature

[PTL 1] Japanese Patent No. 4480048
[PTL 2] Japanese Unexamined Patent Application Publication No. 2008-236968

SUMMARY OF INVENTION

Meanwhile, when the rechargeable battery of the mobile device 101 reaches a full charge and charging ends, the transmitter coil 104 returns to its original position. In this case, after the user picks up the mobile device 101 from the charge pad 102, the rechargeable battery will not be recharged until it is once again placed on the charge pad 102. For this reason, if the mobile device 101 remains placed on the charge pad 102 even after reaching a full charge and expends power stored in the rechargeable battery due to quiescent power drain, the rechargeable battery might not be at a full charge when the user picks up the mobile device 101 from the charge pad 102. If the rechargeable battery of the mobile device 101 is not at a full charge, the charge level of the rechargeable battery will deplete faster than the user anticipates, and the usable time of the mobile device 101 will become shorter.

Consequently, one method of keeping a rechargeable battery at a full charge is to move the transmitter coil 104 to the position of the mobile device 101 at fixed time intervals and check the charge state of the rechargeable battery even after charging of the rechargeable battery has finished. However, if the transmitter coil 104 is moved to the mobile device 101 many times, the transmitter coil 104 will not only be moved unnecessarily, but the power expended by the charge pad 102 will also increase.

Also, if various types of commands are defined as disclosed in PTL 1, the mobile device 101 and the charge pad 102 will both require memory to store such commands, thus memory storage volume. Also, even if a power transmitting apparatus initiates a power transmitting operation as disclosed in PTL 2, the operation will be superfluous if the rechargeable battery provided in the power receiving apparatus is at a sufficient charge level.

According to an embodiment of the present disclosure, there is provided a mobile device provided with a receiver coil that outputs AC power received from a charging apparatus that wirelessly charges a rechargeable battery in a mobile device in which a change of capacitance is detected, a rectifier that rectifies the AC power output by the receiver coil into DC power, a capacitor disposed between the receiver coil and the rectifier, a charger that charges a rechargeable battery with the DC power rectified by the rectifier, and measures the charge level of the rechargeable battery, a switch that connects or disconnects the receiver coil and the capacitor, and a charging controller that applies control to disconnect the capacitor from the receiver coil with the switch in the case where the charge level of the rechargeable battery is equal to or greater than a given threshold value, and applies control to connect the capacitor to the receiver coil with the switch in the case where the charge level of the rechargeable battery is less than the threshold value.

According to the present disclosure, when a once fully-charged rechargeable battery is not recharged and the charge level of the rechargeable battery becomes less than a given threshold value, a switch connects a receiver coil and a capacitor, and a charging apparatus is able to detect a change in the capacitance of the capacitor. For this reason, the charging apparatus moves a transmitter coil to the position where a mobile device was placed and starts recharging its rechargeable battery, and the charge level of the rechargeable battery attached to the mobile device can be kept equal to or greater than a given threshold value.

BRIEF DESCRIPTION OF DRAWINGS

FIG. 4 is a flowchart illustrating an exemplary process for issuing recharge instructions after a charging controller has detected a full charge in a first embodiment of the present disclosure.

FIGS. 15A and 15B are explanatory diagrams illustrating, in table form, associative relationships between rechargeable battery charge levels and charge priority order settings and switch states respectively in a fourth embodiment of the present disclosure.

DESCRIPTION OF EMBODIMENTS

Figure 1:
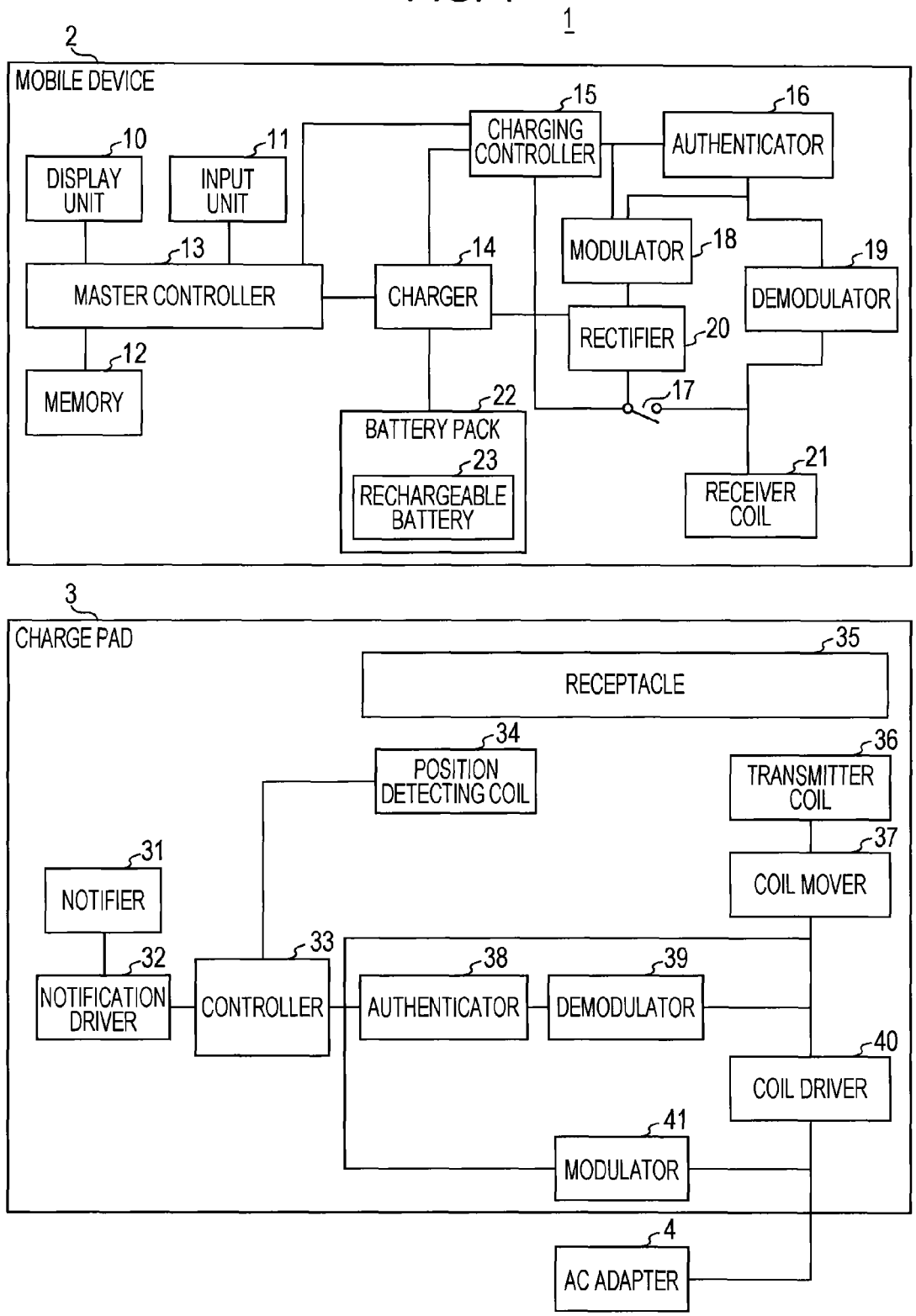
FIG. 1 is a block diagram illustrating an exemplary internal configuration of a wireless charging system in a first embodiment of the present disclosure.

Hereinafter, embodiments for carrying out the present disclosure (hereinafter designated embodiments) will be described. Hereinafter, the description will proceed in the following order.

1-1. First embodiment (example of charging a rechargeable battery in a battery pack inserted into a mobile device)
1-2. Modification of first embodiment (example of issuing instructions to start recharging by operational input from the user)
2-1. Second embodiment (example of charging rechargeable batteries in battery packs inserted into a plurality of mobile devices)
2-2. Modification of second embodiment (example of setting recharge priority order by operational input from the user)
3. Modification of third embodiment (example of charging a rechargeable battery in another mobile device when the charge level of a rechargeable battery exceeds a threshold value)
4. Modification of fourth embodiment (example of setting rechargeable battery charge levels and recharge priority order)
5-1. First modification
5-2. Second modification 1-1. First Embodiment Example of Charging a Rechargeable Battery in a Battery Pack Inserted into a Mobile Device Hereinafter, a first embodiment of the present disclosure will be described with reference to FIGS. 1 to 5. In the present embodiment, an example will be described wherein a charge pad 3 wirelessly charges a rechargeable battery 23 in a battery pack 22 inserted into a mobile device 2, which is used as an information processing device such as a mobile phone or ebook reader, for example. The mobile device 2 adopts a moving coil technique and realizes a charge instructing method that issues instructions to start charging a rechargeable battery to a charge pad 3, which wirelessly charges a rechargeable battery 23 in a mobile device 2 in which a change of capacitance is detected. This charge instructing method is realized by a computer in the mobile device 2 executing a program, with internal blocks operating in coordination therewith. First, an exemplary configuration of a wireless charging system 1 combining a mobile device 2 and a charge pad 3 will be described.

FIG. 1 illustrates an exemplary internal configuration of a wireless charging system 1.

The wireless charging system 1 is provided with the mobile device 2 and the charge pad 3 discussed above.

The mobile device 2 is provided with a display unit 10 that displays images, an input unit 11 upon which operational input is conducted by the user, a master controller 13 that controls respective units such as memory 12 which stores various settings, and a charger 14 that charges a rechargeable battery 23 included in a battery pack 22 by means of DC power which has been rectified by a rectifier 20 under control by the master controller 13. The charger 14 also includes functions for applying control such that overcharging does not occur by means of a protection circuit not illustrated, and also includes functions for measuring the charge level of the rechargeable battery 23. Additionally, a lithium-ion rechargeable battery is used for the rechargeable battery 23, for example.

The mobile device 2 is also provided with a charging controller 15 that monitors the charging voltage when the charger 14 charges the rechargeable battery 23 and applies control to the charger 14 to start or stop charging, and an authenticator 16 that authenticates the starting or stopping of charging with commands received from the charge pad 3. The mobile device 2 is also provided with a receiver coil 21 that receives AC power from a transmitter coil 36 provided in the charge pad 3, a rectifier 20 that rectifies AC power output by the receiver coil 21 into DC power, and a switch 17 that connects or disconnects the rectifier 20 and the receiver coil 21. Also provided are a modulator 18 that applies load modulation to a digital signal or command, etc. generated by the master controller 13 on the basis of an authentication signal from the authenticator 16 and transmits it to the transmitter coil 36 of the charge pad 3, and a demodulator 19 that extracts a digital signal from an AC wave received from the charge pad 3, demodulates it, and outputs it to the authenticator 16.

Herein, in the case where the transmitter coil 36 provided in the charge pad 3 is taken to be the primary coil, the receiver coil 21 provided in the mobile device 2 functions as the secondary coil that inductively couples with the transmitter coil 36 and receives AC power. The AC wave of the AC power functions as a carrier that carries a digital signal. The authenticator 16, following instructions from the master controller 13, communicates with the charge pad 3 via the receiver coil 21. Additionally, the authenticator 16 determines the type of command from a digital signal contained in the AC power received by the receiver coil 21 from the charge pad 3, and notifies the master controller 13 of the authenticated result via the charging controller 15.

Meanwhile, the charge pad 3 is provided with a receptacle 35 upon which a mobile device 2 is placed, a controller 33 that controls the respective units provided in the charge pad 3, and a position detecting coil 34 that acts as a position detector which detects the position of a mobile device 2 placed on the receptacle 35 according to changes in capacitance. The charge pad 3 is also provided with a transmitter coil 36 that transmits AC power to the charge pad 3, and a coil mover 37 that moves the transmitter coil 36 to the position of a mobile device 2 detected by the position detecting coil 34 on a plane parallel to the receptacle 35.

The charge pad 3 is also provided with a coil driver 40 that supplies AC power to the transmitter coil 36 and causes the transmitter coil 36 to transmit power, a demodulator 39 that demodulates a digital signal received by the transmitter coil 36 from a mobile device 2, and an authenticator 38 that authenticates a mobile device 2 with a demodulated digital signal. The charge pad 3 is also provided with a modulator 41 that modulates AC power supplied by an AC adapter 4 connected to an AC power supply, a notifier 31 that notifies the user of the charging state using an LED, etc., and a notification driver 32 that drives the notifier 31.

Upon receiving a signal from the receiver coil 21 of a mobile device 2, the demodulator 39 of the charge pad 3 receives AC power produced by the transmitter coil 36 on the basis of this signal. The demodulator 39 extracts and demodulates a digital signal from this AC power, and outputs it to the authenticator 38. The authenticator 38 determines and authenticates a command corresponding to the digital signal obtained by the demodulator 39, and notifies the controller 33 of the authenticated result.

The AC adapter 4 is connected to an AC power supply not illustrated, and outputs AC power to the coil driver 40 via a power supply cable. Although the AC adapter 4 is provided in a separate case from the charge pad 3, the AC adapter 4 may also be internally provided in the charge pad 3 as one of its circuits.

In the receptacle 35, the position detecting coil 34 is provided separately from the transmitter coil 36 and disposed with the receptacle 35 overlaid. A detection current used to detect a mobile device 2 flows through the position detecting coil 34. The position detecting coil 34 identifies the position of a mobile device 2 by detecting changes in the capacitance of the receiver coil 21 in a mobile device 2 placed on the receptacle 35 and a capacitor 24a (discussed later with reference to FIG. 2) disposed at the rectifier 20, and causes the transmitter coil 36 to move to the position where the mobile device 2 is placed.

The flow of a process conducted after a rechargeable battery 23 is completely charged and the transmitter coil 36 has returned to its original position, and until recharging is conducted, will be hereinafter described.

Even though a rechargeable battery 23 has reached a full charge, the controller 33 recognizes that a mobile device 2 has not been removed from the receptacle 35 according to a detection current received from the position detecting coil 34. At this point, the charging controller 15 in the mobile device 2 applies control to disconnect the rectifier 20 (in FIG. 2, the capacitor 24a) from the receiver coil 21 with the switch 17 in the case where the charge level of the rechargeable battery 23 is equal to or greater than a threshold value, and applies control to connect the capacitor 24a to the receiver coil 21 with the switch 17 in the case where the charge level of the rechargeable battery 23 is less than a threshold value.

If the receiver coil 21 and the capacitor 24a are disconnected, the position detecting coil 34 ceases to detect that a mobile device 2 is placed on the receptacle 35, and the controller 33 recognizes that the mobile device 2 has been removed from the receptacle 35. If a given amount of time elapses after disconnecting and the charge level of a rechargeable battery 23 which sufficiently had power decreases to less than a given threshold value due to the quiescent power drain, etc. of the mobile device 2, the switch 17 connects the capacitor 24a to the receiver coil 21. At this point, since the charge pad 3 recognizes that a mobile device 2 has been placed on the receptacle 35, it summons the transmitter coil 36 of the receptacle 35 to the position where the mobile device 2 was placed, and starts recharging the battery pack 22. In so doing, recharging can be conducted automatically when the charge level of a rechargeable battery 23 becomes less than a given threshold value.

Figure 2:
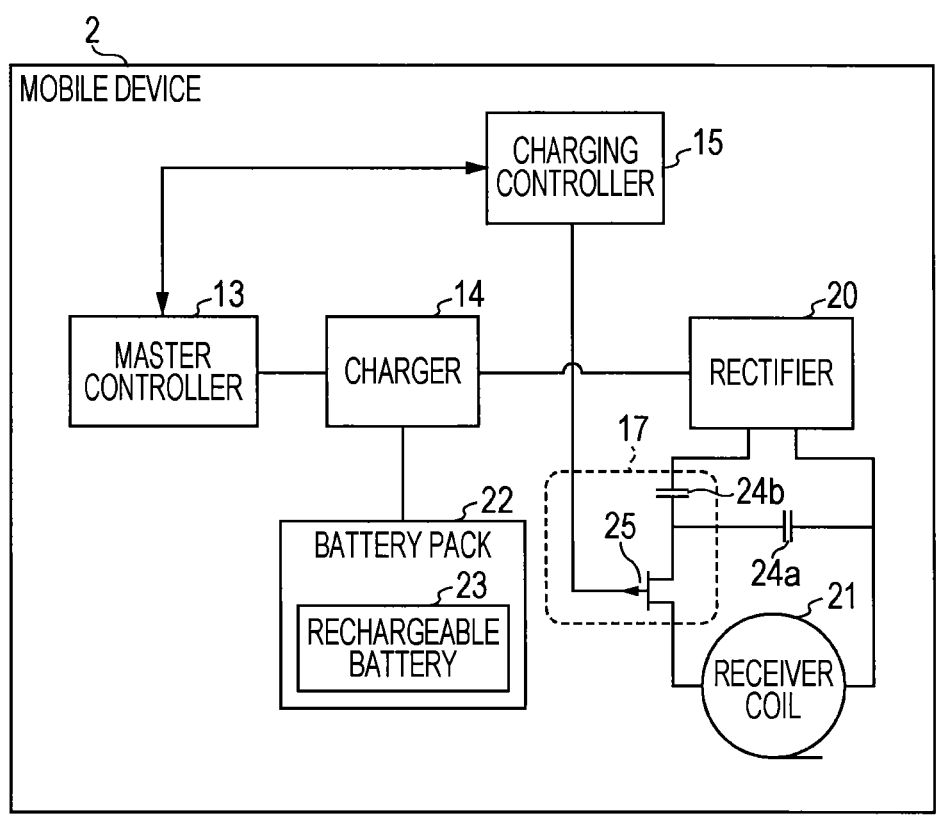
FIG. 2 is a block diagram illustrating an exemplary detailed internal configuration of a mobile device in a first embodiment of the present disclosure.

FIG. 2 is a block diagram illustrating an exemplary detailed internal configuration of a mobile device 2.

As discussed earlier, a mobile device 2 is provided with a master controller 13, a charger 14, a charging controller 15, a rectifier 20, a receiver coil 21, a battery pack 22, and a rechargeable battery 23. The master controller 13 and the charging controller 15 are connected to each other, with the master controller 13 receiving notifications on the state of the charge level of the rechargeable battery 23 from the charging controller 15 and issuing charge instructions to the charging controller 15. The mobile device 2 is also provided with a capacitor 24a connected in parallel with the receiver coil 21 and a capacitor 24b connected in series with the receiver coil 21. The capacitor 24a is used in order for the charge pad 3 to detect the position of the mobile device 2, while the capacitor 24b is used in order for the charge pad 3 to transmit power to the mobile device 2. Additionally, a switch 17 is provided between the receiver coil 21 and the capacitor 24a. The switch 17, under control by the charging controller 15, switches connection or disconnection of the receiver coil 21 and the capacitor 24a, thereby connecting or disconnecting the rectifier 20 and the receiver coil 21.

A field-effect transistor (FET) 25 is used as the switch 17, for example. Additionally, when the rechargeable battery 23 reaches a full charge, the charging controller 15 turns off the switch 17 to disconnect the receiver coil 21 from the rectifier 20. At this point, the controller 33 of the charge pad 3 ceases to detect that a mobile device 2 is placed on the receptacle 35. Also, the charging controller 15 turns on the switch 17 when the charge level of the rechargeable battery 23 falls below a threshold value. In so doing, the controller 33 of the charge pad 3 is able to recognize that a mobile device 2 is placed on the receptacle 35 and summon the transmitter coil 36 to the position of the mobile device 2.

Figure 3:
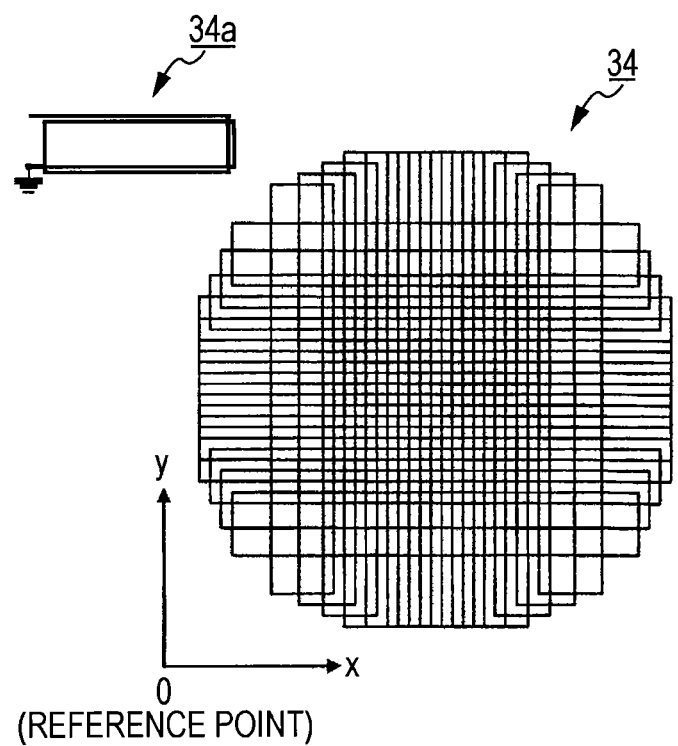
FIG. 3 is an explanatory diagram illustrating an exemplary configuration of a position detecting coil in a first embodiment of the present disclosure.

FIG. 3 illustrates an exemplary configuration of a position detecting coil 34.

In the position detecting coil 34, a lattice of plural detecting coils 34a are disposed in the x and y directions of the charge pad 3 and form an approximately circular shape. Pulses of a detection voltage are input into the detecting coils 34a at given timings. When a mobile device 2 is placed on the receptacle 35 of the charge pad 3, there is a change in the amplitudes of the detection voltages output by the detecting coils 34a. The controller 33 measures the detection voltages that the position detecting coil 34 outputs from each detecting coil from the x and y directions, and computes the position on the charge pad 3 where a mobile device 2 was placed.

FIG. 4 is a flowchart illustrating an exemplary process for issuing recharge instructions after a charging controller 15 has detected a full charge.

First, upon detecting that the charger 14 has fully charged a rechargeable battery 23, the charging controller 15 informs the master controller 13 that a full charge has been detected. Then, the master controller 13 outputs to the charger 14 a signal to end charging, and ends charging of the rechargeable battery 23 (step S1). Next, the charging controller 15 turns off the switch 17 and disconnects the receiver coil 21 and the capacitor 24a (step S2). At this point, the charging controller 15 controls operation of the field-effect transistor 25 to disconnect the receiver coil 21 and the capacitor 24a.

After that, the charging controller 15 monitors the charge level of the rechargeable battery 23 (step S3). If the charge level of the rechargeable battery 23 is equal to or greater than a threshold value, the monitoring process in step S3 is repeated, and the charge level continues to be monitored. In contrast, upon detecting that the charge level of the rechargeable battery 23 has become less than a threshold value due to self-discharge or quiescent power drain of the mobile device 2, the charging controller 15 turns on the switch 17 (step S4) and starts recharging the battery pack 22 (step S5). When the switch 17 is turned on or off, the charging controller 15 controls operation of the field-effect transistor 25 and connects or disconnects the receiver coil 21 and the capacitor 24a.

After starting recharging, the charging controller 15 ends charging when the rechargeable battery 23 reaches a full charge (step S6), turns off the switch 17, and disconnects the receiver coil 21 and the capacitor 24a (step S7). Then, the process returns to the monitoring process of step S3 and is repeated until the mobile device 2 is removed from the receptacle 35.

Figure 5A:
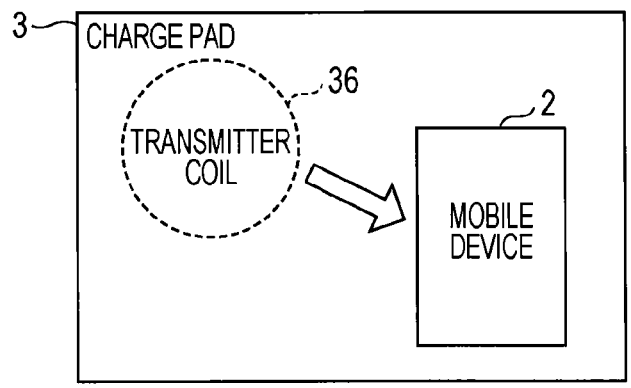
FIG. 5A, FIG. 5B, FIG. 5C, and FIG. 5D are explanatory diagrams illustrating an exemplary operation of a wireless charging system in a first embodiment of the present disclosure, where the respective figures illustrate a successive set of movements between a transmitter coil and a mobile service.
Figure 5B:
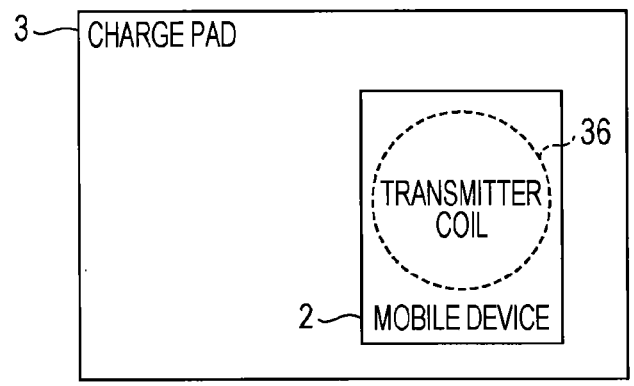
Figure 5C:
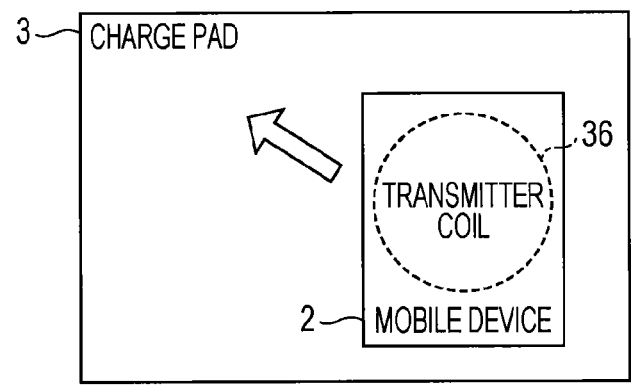
Figure 5D:
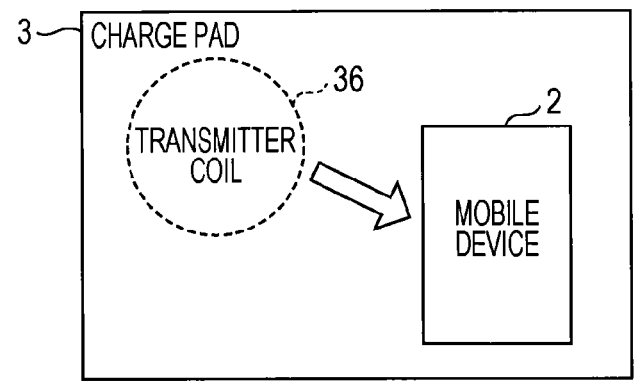

FIGS. 5A-5D illustrate an exemplary operation of a charge pad 3. FIG. 5A illustrates an exemplary state wherein a mobile device 2 is placed on a charge pad 3, while FIG. 5B illustrates an exemplary state wherein a rechargeable battery 23 is being charged. FIG. 5C illustrates an example wherein a rechargeable battery 23 has finished charging, while FIG. 5D illustrates an example wherein a rechargeable battery 23 is recharged.

When a mobile device 2 is placed on the receptacle 35 of a charge pad 3, the position detecting coil 34 detects the position of the mobile device 2 (FIG. 5A), while the transmitter coil 36 moves to the position of the mobile device 2 and starts charging the rechargeable battery 23 (FIG. 5B).

When the charge level of the rechargeable battery 23 becomes equal to or greater than a threshold value and charging ends, the receiver coil 21 of the mobile device 2 is disconnected by the switch 17, and the transmitter coil 36 returns to its original position in charge standby (the upper-left corner of the receptacle 35) (FIG. 5C). After that, if the charge level of the rechargeable battery 23 becomes less than a fixed threshold value, the charging controller 15 operates the switch 17 and connects the receiver coil 21. In so doing, the transmitter coil 36 of the receptacle 35 once again moves to the position where the mobile device 2 is placed and starts recharging the battery pack 22 (FIG. 5D).

According to a wireless charging system 1 in accordance with a first embodiment described above, upon detecting a full charge in a rechargeable battery 23, a charging controller 15 turns off a switch 17 and disconnects a receiver coil 21 and a capacitor 24a. After that, the charging controller 15 monitors the charge level of the rechargeable battery 23, and if the charge level becomes less than a threshold value, the charging controller 15 turns on the switch 17, connects the receiver coil 21 and the capacitor 24a, and starts charging the rechargeable battery 23 again. In this way, since charging is automatically started and stopped according to the charge level of the rechargeable battery 23, the charge level of the rechargeable battery 23 is kept equal to or greater than a fixed threshold value. For this reason, the user is able to use the mobile device 2 in a state wherein the rechargeable battery 23 is nearly fully charged.

1-2. Modification of First Embodiment

Example of Issuing Instructions to Start Recharging by Operational Input from the User Herein, in the first embodiment discussed above, a mobile device 2 requests a charge pad 3 for a recharge if the charge level of the rechargeable battery 23 becomes less than a threshold value. However, by configuring the input unit 11 with a touch panel, operable buttons, etc., it is also possible to cause the charging controller 15 to apply control to connect the capacitor 24a to the receiver coil 21 with the switch 17, even if the charge level of the rechargeable battery 23 is equal to or greater than a threshold value. For this reason, it is also possible to arbitrarily control the timing at which to start recharging with the timing at which the user wants to recharge. Upon receiving operational input with the input unit 11, a mobile device 2 turns on the switch 17 and connects the receiver coil 21 and the capacitor 24a. In so doing, it becomes possible to issue recharging instructions at the user's arbitrary timings.

2-1. Second Embodiment

Example of Charging Rechargeable Batteries in Battery Packs Inserted into a Plurality of Mobile Devices Next, a mobile device 5 and a charge pad 6 in accordance with a second embodiment of the present disclosure will be described with reference to FIGS. 6 to 11. In the following description, like symbols are given to parts already described in the first embodiment, and detailed description thereof is reduced or omitted.

In a wireless charging system 1 in accordance with the first embodiment discussed earlier, in the case where a plurality of mobile devices 2 placed on the charge pad 3 all require recharging, for example, the charge pad 3 is unable to ascertain a charge priority order for recharging if the receiver coil 21 and the capacitor 24a are connected in each mobile device 2. For this reason, in the second embodiment, a wireless charging system is configured such that a charge pad 6 is able to recharge a plurality of mobile devices 5 in accordance with their priority order. Hereinafter, exemplary internal configurations and exemplary operation of a mobile device 5 and a charge pad 6 will be described.

Figures 6, 7:
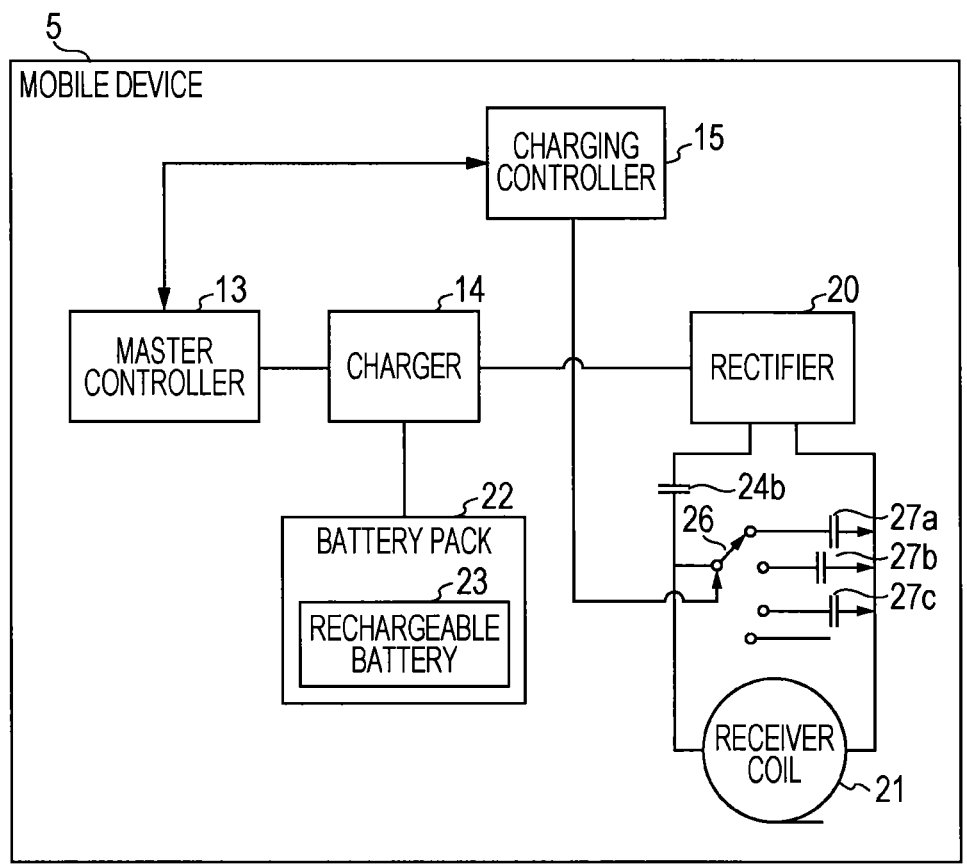
FIG. 6 is a block diagram illustrating an exemplary internal configuration of a mobile device in a second embodiment of the present disclosure.
FIG. 7 is an explanatory diagram illustrating, in table form, associative relationships between rechargeable battery charge levels and switch states in a second embodiment of the present disclosure.

FIG. 6 illustrates an exemplary internal configuration of a mobile device 5.

Similarly to a mobile device 2 in accordance with the first embodiment discussed earlier, a mobile device 5 is provided with a master controller 13, a charger 14, a charging controller 15, a receiver coil 21, a battery pack 22, and a rechargeable battery 23. However, the mobile device 5 is provided with a plurality of capacitors 27a to 27c with differing capacitances disposed between the receiver coil 21 and the rectifier 20, and a switch 26 that switches connection or disconnection of the receiver coil 21 and the capacitors 27a to 27c. The capacitors 27a to 27c are connected in parallel to the receiver coil 21 via the switch 26.

The switch 26 is able to disconnect the receiver coil 21 from the capacitors 27a to 27c, or switch to one of the capacitors 27a to 27c and connect it to the receiver coil 21. Herein, the capacitances of the capacitors 27a to 27c are C1, C2, and C3, respectively, with the magnitudes of the capacitances being C1<C2<C3. Additionally, in the case where the charge level of the rechargeable battery 23 is less than a given threshold value, the charging controller 15 applies control to connect one of the capacitors 27a to 27c of predetermined capacitance and the receiver coil 21 with the switch 26 according to the charge level of the rechargeable battery.

FIG. 7 is an explanatory diagram illustrating, in table form, associative relationships between charge levels of the rechargeable battery 23 and states of the switch 26. In the following description, the percentage of the charge level with respect to the battery capacity of a rechargeable battery 23 at full charge will be simply abbreviated as "the charge level is x %".

In the case where the charge level of the rechargeable battery 23 is 90-100% (full charge), the switch 26 is disconnected, and the receiver coil 21 and the capacitor 24 are not connected. Additionally, in the case where the charge level of the rechargeable battery 23 is 80-89%, the switch 26 is connected to the capacitor 27a whose capacitance is C1. Also, in the case where the charge level of the rechargeable battery 23 is 70-79%, the switch 26 is connected to the capacitor 27b whose capacitance is C2. Additionally, in the case where the charge level of the rechargeable battery 23 is 0-69%, the switch 26 is connected to the capacitor 27c whose capacitance is C3.

Figure 8:
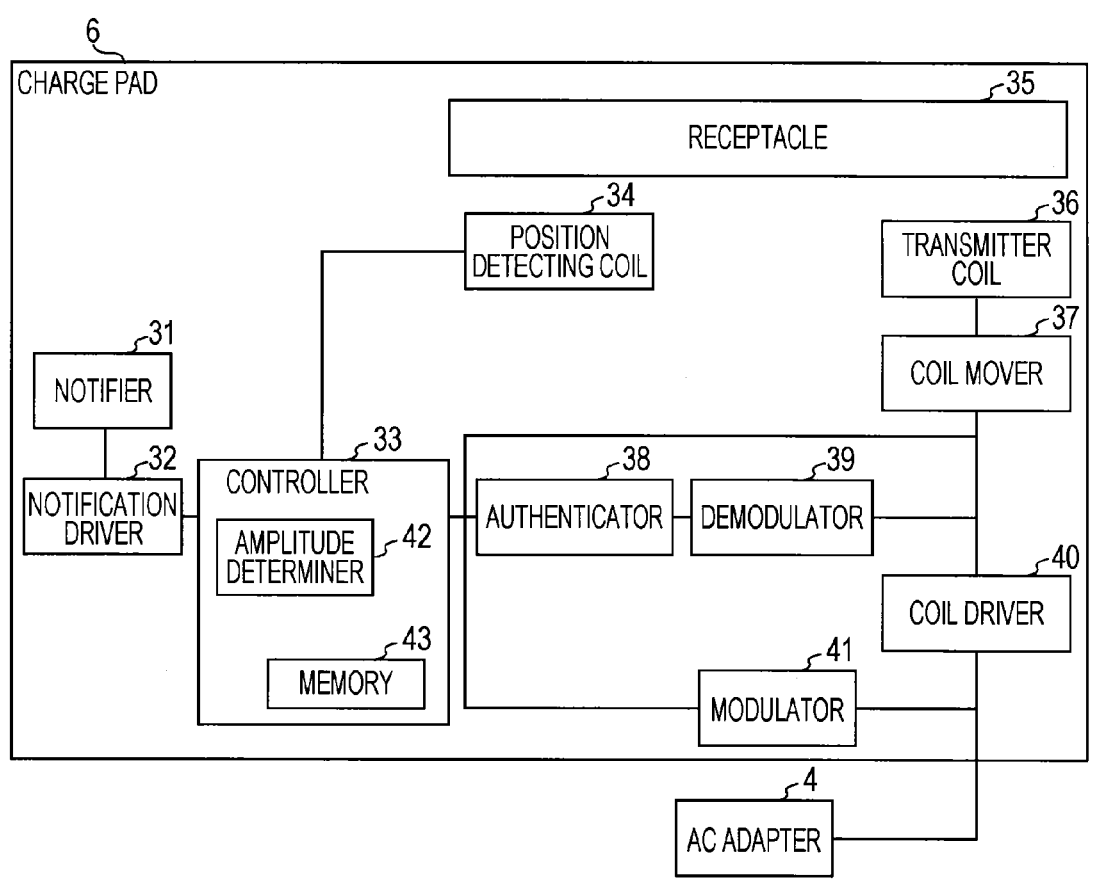
FIG. 8 is a block diagram illustrating an exemplary internal configuration of a charge pad in a second embodiment of the present disclosure.

FIG. 8 illustrates an exemplary internal configuration of a charge pad 6.

Similarly to a charge pad 3 in accordance with the first embodiment discussed earlier, the charge pad 6 is provided with a notifier 31, a notification driver 32, a controller 33, a position detecting coil 34, a receptacle 35, a transmitter coil 36, a coil mover 37, an authenticator 38, a demodulator 39, a coil driver 40, and a modulator 41. The charge pad 6 is also provided with an amplitude determiner 42 and memory 43 in the controller 33. The amplitude determiner 42 detects the types of capacitors 27a to 27c connected to the switch 26 provided in mobile devices 5 by the magnitude of detection currents output by the position detecting coil 34 at the positions of a plurality of mobile devices 5, and writes the types, positions, detected times, etc. of the capacitors 27a to 27c to the memory 43.

When a mobile device 5 is placed on the receptacle 35 of the charge pad 6, there is a change in the amplitude of the detection current flowing through the position detecting coil 34 that depends on the magnitude of the capacitance of one of the capacitors 27a to 27c which is connected to the receiver coil 21 provided in the mobile device 5. The amplitude determiner 42 is able to determine the type of capacitor connected to the receiver coil 21 according to the magnitude of this amplitude of the detection current.

Figure 9:
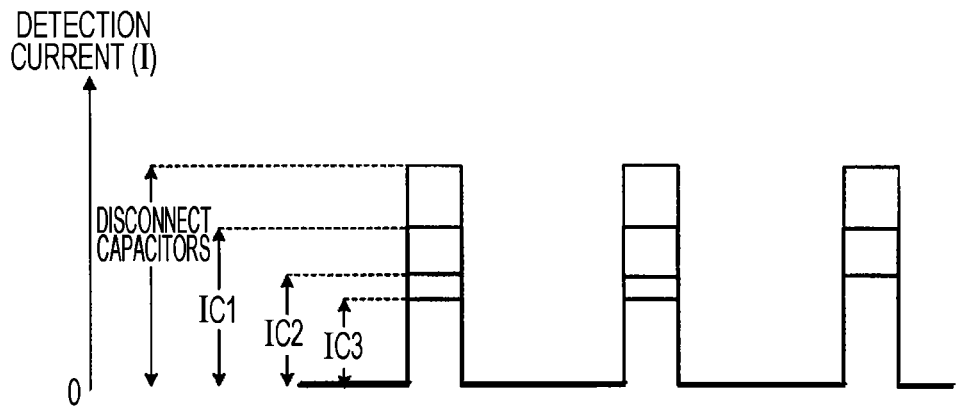
FIG. 9 is an explanatory diagram illustrating exemplary changes in detection current pulses output by a position detecting coil in a second embodiment of the present disclosure.

FIG. 9 illustrates exemplary changes in detection current pulses output by a position detecting coil 34.

When a plurality of mobile devices 5 are placed on a charge pad 6, there is a change in the amplitude of the detection current in the position detecting coil 34 of the charge pad 6 that depends on the capacitances of the capacitors 27a to 27c connected to the receiver coil 21 in each mobile device 5.

The amplitude of the detection current output by the position detecting coil 34 becomes largest if the switch 26 is disconnected from the capacitors 27a to 27c. Additionally, when switching among the capacitors 27a to 27c connected to the switch 26, the amplitude of the detection current output by the position detecting coil 34 decreases in order of the capacitances C1, C2, and C3 of the respective capacitors.

The amplitude determiner 42 provided in the charge pad 6 senses changes in the amplitude of the detection current received from the position detecting coil 34. Thus, the amplitude determiner 42 determines the positions (x, y) on the receptacle 35 of each receiver coil 21 provided in the mobile devices 5 placed on the charge pad 6, as well as the magnitude of the capacitance of the capacitor connected to each receiver coil 21. Then, the controller 33 starts charging by prioritizing the mobile device 5 whose receiver coil 21 is connected to the capacitor with the largest capacitance from among the plurality of mobile devices 5 sensed by the amplitude determiner 42. In so doing, it becomes possible to assign a priority order and start recharging a plurality of mobile devices 5. Meanwhile, in the case where a plurality of mobile devices 5 are connected to capacitors with the same capacitance, a priority order is determined by the order in which the mobile devices 5 were placed, etc.

Figure 10:
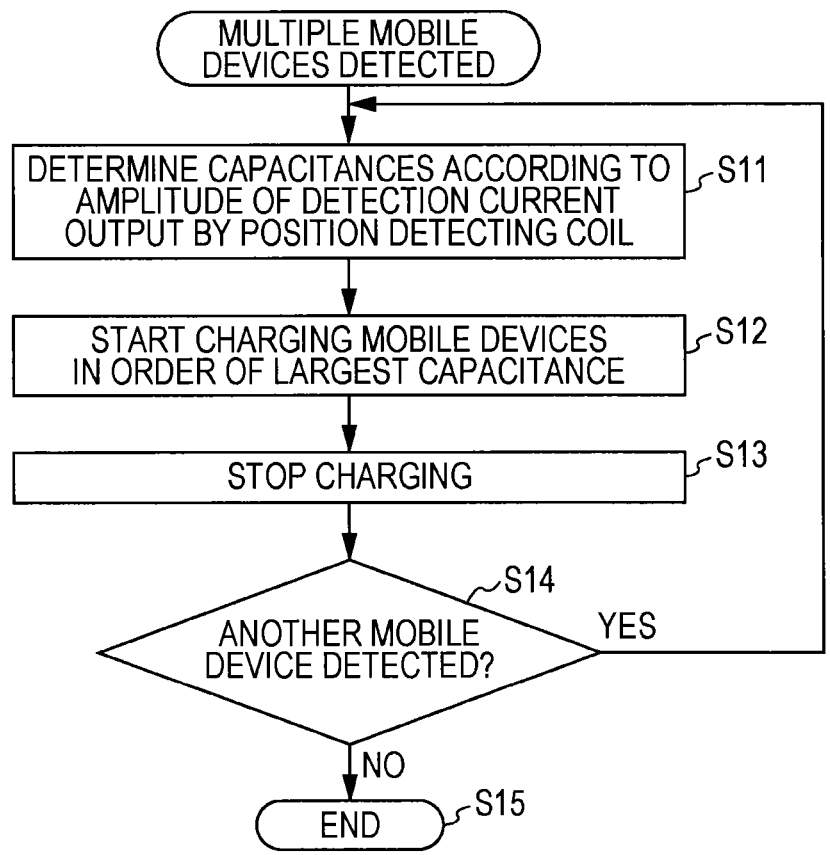
FIG. 10 is a flowchart illustrating an exemplary process whereby a controller in a charge pad detects a plurality of mobile devices in a second embodiment of the present disclosure.

FIG. 10 illustrates an exemplary process whereby the controller 33 of a charge pad 6 detects a plurality of mobile devices 5 placed on the receptacle 35 and charges them by assigning a recharge priority order.

First, the amplitude determiner 42 of the controller 33 determines the charge levels of the mobile devices 5 placed on the receptacle 35 by receiving the detection current output by the position detecting coil 34 (step S11). At this point, in the plurality of mobile devices 5, the switch 26 is connected to one of the capacitors 27a to 27c on the basis of the charge level of each respective rechargeable battery 23.

Next, in order to start charging the rechargeable battery 23 of the mobile device 5 in which the switch 26 is connected to the capacitor 27c having the largest capacitance, the controller 33 issues instructions to the coil mover 37 to move the transmitter coil 36 to that mobile device 5 (step S12). Then, charging is started for the rechargeable battery 23 in the mobile device 5 to which the transmitter coil 36 moved.

Additionally, when charging finishes for this rechargeable battery 23 (step S13), the controller 33 determines whether or not another mobile device 5 waiting to be charged has been detected (step S14). In the case of detecting a mobile device 5 waiting to be charged, the controller 33 once again repeats the charging process starting from step S11. In the case of not detecting a mobile device 5 waiting to be charged, the controller 33 ends the charging process.

Figures 11, 12:
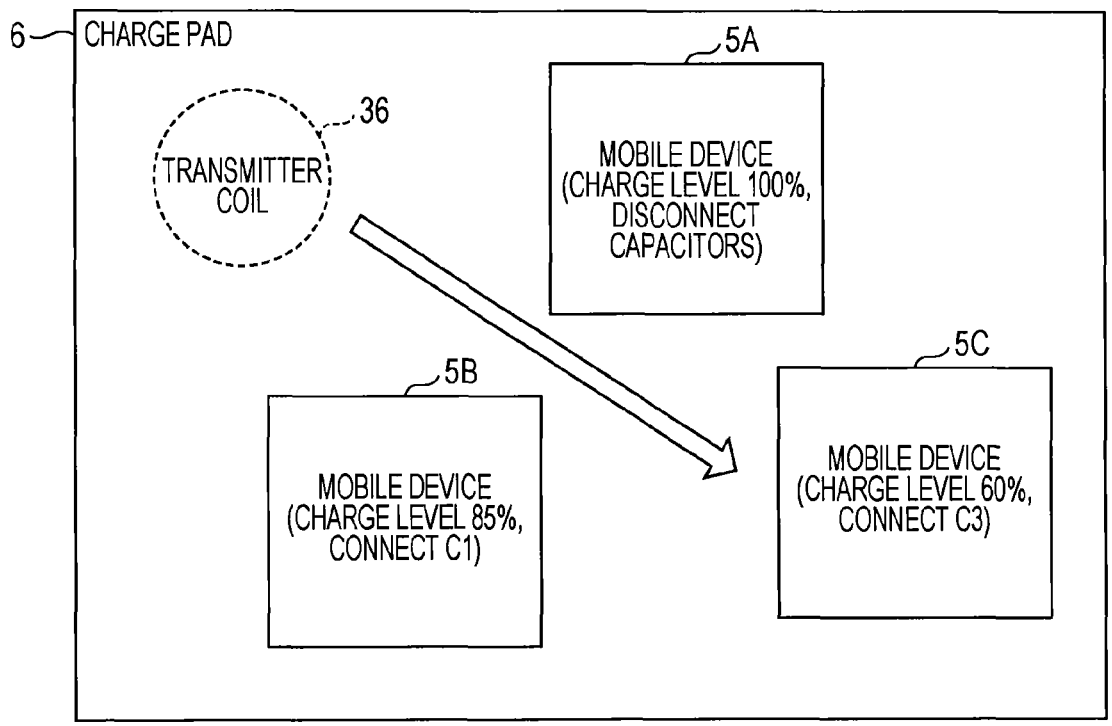
FIG. 11 is an explanatory diagram illustrating exemplary operation in the case of charging a plurality of mobile devices in a second embodiment of the present disclosure.
FIG. 12 is an explanatory diagram illustrating an exemplary priority order in which the user has set a priority order and capacitors connected to a receiver coil when a recharge is requested in a modification of a second embodiment of the present disclosure.

FIG. 11 illustrates operation of a charge pad 6 in the case of charging a plurality of mobile devices 5A to 5C. In FIG. 11, the mobile devices 5 on the charge pad 6 are assigned the symbols 5A to 5C in order to more easily distinguish them, but a mobile device 5 and the mobile devices 5A to 5C have the same internal configuration.

Three mobile devices 5A to 5C are placed on the receptacle 35 of a charge pad 6. Since the charge level of the rechargeable battery 23 in the mobile device 5A is 100% (full charge), the switch 26 disconnects the capacitors 27a to 27c and the receiver coil 21, and the charge pad 6 does not recognize the mobile device 5A.

Since the charge level of the rechargeable battery 23 in the mobile device 5B is 85%, the switch 26 connects the capacitor 27a whose capacitance is C1 to the receiver coil 21. Also, since the charge level of the rechargeable battery 23 in the mobile device 5C is 60%, the switch 26 connects the capacitor 27c whose capacitance is C3 to the receiver coil 21. In this way, the charge pad 6 recognizes changes in the capacitances of the receiver coil 21 and the capacitors 27a and 27c respectively provided in the mobile devices 5B and 5C. Also, the magnitudes of the capacitances of the capacitors 27a to 27c satisfy the relationship C1<C2<C3 (see FIG. 7). For this reason, the controller 33 of the charge pad 6 is able to find the mobile device 5C whose rechargeable battery 23 is at the lowest charge level, move the transmitter coil 36 in order to charge the rechargeable battery 23 in this mobile device 5C with priority, and start charging.

Furthermore, when charging of the rechargeable battery 23 in the mobile device 5C is completed, charging of the rechargeable battery 23 in the mobile device 5B is started next. In so doing, it is possible to rapidly detect the mobile device whose rechargeable battery 23 is at the lowest charge level and start charging, even when a plurality of mobile devices 5A to 5C are placed on the receptacle 35 of a charge pad 6. For this reason, recharging can be efficiently started even in cases where the charge level of a rechargeable battery 23 has decreased due to quiescent power drain, etc. by a mobile device whose rechargeable battery 23 had been fully charged by wireless charging.

According to a wireless charging system in accordance with the second embodiment described above, a charging controller 15 toggles a switch 26 to connect a receiver coil 21 to capacitors with differing capacitances according to the charge level of a rechargeable battery 23. For this reason, a charge pad 6 detects changes of capacitors in a plurality of mobile devices 5, and starts charging mobile devices 5 in accordance with a priority order. For this reason, the mobile device 5 equipped with the rechargeable battery 23 at the lowest charge level can be charged with priority.

2-2. Modification of Second Embodiment

Example of Setting Recharge Priority Order by Operational Input from the User

However, it is also possible for the user to set a charge priority order in advance.

FIG. 12 illustrates an exemplary priority order in which the user has set a priority order and capacitors connected to a receiver coil 21 when a recharge is requested.

The user operates the input unit 11 of a mobile device 5 and sets in advance a priority order for recharging. The master controller 13 writes the set information to the memory 12.

The charging controller 15, following the priority order for a plurality of mobile devices 5 input from the input unit 11, applies control to connect the capacitors 27a to 27c to the receiver coil 21 with the switch 26. For example, if the charge level of a rechargeable battery 23 provided in a mobile device 5 placed on the receptacle 35 of a charge pad 6 falls below 80%, the charging controller 15 reads out the set priority order from the memory 12 and toggles the switch 26. At this point, recharging will be conducted following the priority order set by the input unit 11 in the case where a plurality of mobile devices 5 requesting a recharge are placed on the receptacle 35.

3. Third Embodiment

Example of Charging a Rechargeable Battery in Another Mobile Device when the Charge Level of a Rechargeable Battery Exceeds a Threshold Value Next, a charge pad 6 in accordance with a third embodiment of the present disclosure will be described with reference to FIG. 13. Herein, the charge pad 6 indicated in the second embodiment will be used to illustrate a technique of controlling efficient charging of rechargeable batteries 23 provided in a plurality of mobile devices 5. In the following description, like symbols are given to parts already described in the first and second embodiments, and detailed description thereof is reduced or omitted.

First, assume an example wherein three mobile devices 5 are placed on a charge pad 6 and the capacitors are switched according to the charge levels of the rechargeable batteries 23 as illustrated in FIG. 7, with the charge levels of the rechargeable batteries 23 respectively provided in the mobile devices 5 taken to be 80%, 70%, and 30%. If a charging method in accordance with the second embodiment discussed above is used at this point, charging will first start with the mobile device 5 at the lowest charge level of 30%, and once this rechargeable battery 23 reaches a full charge, the transmitter coil 36 will move to charge the mobile device 5 with the next lowest charge level of 70%.

However, ordinary rechargeable batteries 23 exhibit a characteristic in that the charging current that contributes to charging decreases as the charge level nears full charge. For this reason, it is known that once the charge level of a rechargeable battery 23 exceeds 80%, the amount of time until reaching a full charge (100%) will increase. As a result, if the rechargeable battery 23 in another mobile device 5 is charged after charging the rechargeable battery 23 in a first mobile device 5 up to a full charge, the amount of time until the rechargeable batteries 23 in all mobile devices 5 are completely charged will increase. For this reason, in the third embodiment, a wireless charging system is configured to end charging once the rechargeable battery 23 in a first mobile device 5 nears a full charge and its charge level exceeds a threshold value, and start recharging the rechargeable battery 23 in another mobile device 5. Hereinafter, exemplary operation of a mobile device 5 and a charge pad 6 in accordance with the third embodiment will be described.

A controller 33 in accordance with the third embodiment receives charge order instructions from a plurality of mobile devices, and applies control to transmit power in accordance with the instructed charge order to a plurality of mobile devices which have been placed on the receptacle 35 and in which a charge order has been set in advance. Additionally, in the case where respective capacitors with different capacitances are connected to receiver coils 21 respectively included in a plurality of mobile devices placed on the receptacle 35, the controller 33 determines a mobile device charge order in which to charge the rechargeable batteries 23 according to the capacitances of the capacitors, and applies control to cause the coil mover 37 to move the transmitter coil 36 on the basis of the determined charge order.

Figure 13:
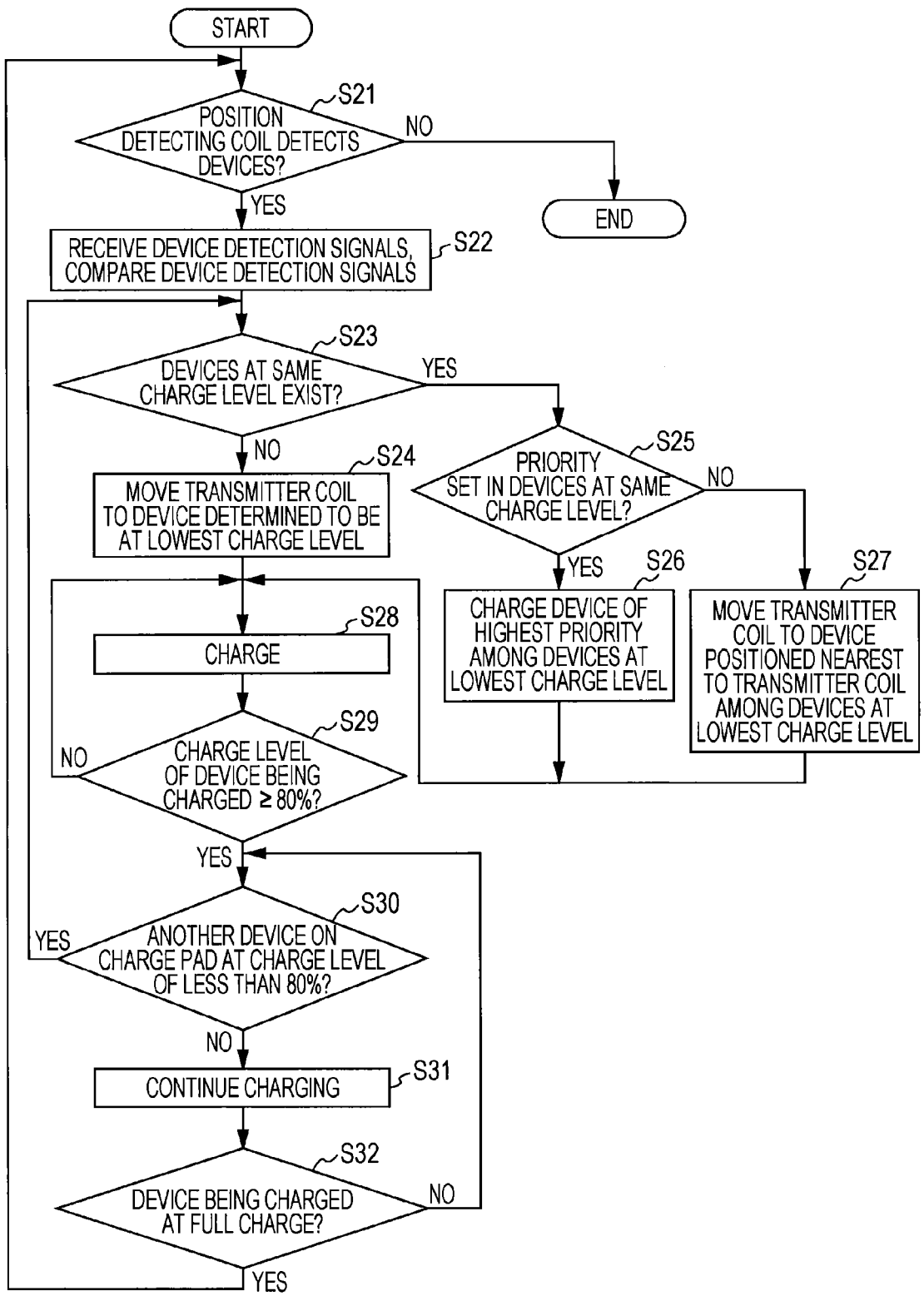
FIG. 13 is a flowchart illustrating an exemplary process of efficiently charging rechargeable batteries provided in a plurality of mobile devices in a third embodiment of the present disclosure.

FIG. 13 illustrates a flowchart illustrating an exemplary process whereby a charge pad 6 efficiently charges rechargeable batteries 23 provided in a plurality of mobile devices 5.

First, the position detecting coil 34 of a charge pad 6 detects whether or not a plurality of mobile devices 5 have been placed on the receptacle 35, and detects the positions of the mobile devices 5 on the receptacle 35 (step S21). The process ends in the case where the position detecting coil 34 does not detect mobile devices 5.

In contrast, in the case where the position detecting coil 34 does detect mobile devices 5, the controller 33 receives device detection signals output by the position detecting coil 34. Then, the controller 33 compares the device detection signals output by the position detecting coil 34 from a plurality of locations on the receptacle 35 (step S22).

Next, from the compared device detection signals, the controller 33 determines whether or not a plurality of mobile devices 5 with rechargeable batteries 23 at the same charge level are placed on the receptacle 35 (step S23). In the case of determining that such mobile devices 5 are not placed on the receptacle 35, the transmitter coil 36 is moved to the position where the mobile device 5 determined to have the lowest charge level is placed (step S24).

In contrast, in the case of determining that a plurality of mobile devices 5 at the same charge level are placed on the receptacle 35, the controller 33 determines whether or not a charging priority order is set for the plurality of mobile devices 5 (step S25). In the case where a priority order is set, the transmitter coil 36 is moved to the mobile device 5 with the highest priority from among the mobile devices 5 at the lowest charge level (step S26).

In contrast, in the case where a priority order is not set in the determination process of step S25, the transmitter coil 36 is moved to the mobile device 5 placed at the position nearest the transmitter coil 36 from among the mobile devices 5 at the lowest charge level (step S27). Then, after proceeding through the processing in steps S24, 26, and 27, the transmitter coil 36 starts charging the rechargeable battery 23 (step S28).

At this point, the controller 33 sets the threshold value at which to end charging at 80%, less than a full charge. If the charge level is less than the threshold value, a sufficiently large charging current can be given to the rechargeable battery 23. Additionally, the controller 33 determines whether or not the charge level of the rechargeable battery 23 being charged by the transmitter coil 36 has exceeded the threshold value of 80% (step S29), and continues charging according to step S28 if the charge level is less than the threshold value. The controller 33 is able to determine the charge level of the rechargeable battery 23 due to the mobile device 5 toggling the switch 26 to the capacitor 27b.

Once the charge level exceeds the threshold value (80%) as a result of continued charging, the controller 33 determines whether or not another mobile device 5 provided with a rechargeable battery 23 at a charge level less than the threshold value is placed on the receptacle 35 of the charge pad 6 (step S30). In the case of determining that another mobile device 5 at a charge level less than the threshold value is placed, the controller 33 proceeds to the processing in step S23, and charges another mobile device 5.

In contrast, in the case where it is determined in the determination process of step S30 that another mobile device 5 at a charge level less than the threshold value is not placed, the rechargeable battery 23 of the mobile device 5 whose charge level has exceeded the threshold value continues to be charged (step S31). Subsequently, it is determined whether or not the rechargeable battery 23 of the charged mobile device 5 has reached a full charge (step S32).

If it is determined in the determination process of step S32 that the rechargeable battery 23 has reached a full charge, the controller 33 proceeds to the processing in step S21 and conducts detection of mobile devices 5. In contrast, if it is determined that the rechargeable battery 23 has not reached a full charge, the controller 33 proceeds to the processing in step S30. Thus, even if the charge level of a rechargeable battery 23 has exceeded the threshold value and is being charged up to a full charge, the transmitter coil 36 can be rapidly moved to another mobile device 5 and recharging can be started in the case where the charge level of a rechargeable battery 23 in another mobile device 5 has become less than the threshold value while charging.

According to a charge pad 6 in accordance with the third embodiment described above, a controller 33 sets a threshold value at which to end charging to a value less than or equal to a full charge (100%) and applies control to start charging another mobile device 5 once the charge level reaches the threshold value, thereby enabling efficient charging overall. For example, if the threshold value is set to 80%, a rechargeable battery 23 can be quickly charged up to approximately 80%, and the rechargeable battery 23 in the next-highest mobile device 5 in the priority order can be charged in a short amount of time. For this reason, the time-consuming recharging from 80-100% can be conducted after the charge levels of the rechargeable batteries 23 provided in all mobile devices 5 has reached approximately 80%. By applying control in this way, respective mobile devices 5 can be charged in a well-balanced way even in cases where there is not enough time to fully charge the rechargeable batteries 23 in all mobile devices 5.

4. Fourth Embodiment

Example of Setting Rechargeable Battery Charge Levels and Recharge Priority Order Next, a charge pad 6 in accordance with a fourth embodiment of the present disclosure will be described with reference to FIGS. 14, 15A and 15B. Herein, the charge pad 6 indicated in the second embodiment will be used to illustrate a technique of controlling efficient charging of rechargeable batteries 23 provided in a plurality of mobile devices 5'. In the following description, like symbols are given to parts already described in the first and second embodiments, and detailed description thereof is reduced or omitted.

In the third embodiment discussed above, there is described a method of applying a priority order for recharging in the case where the charge level of a rechargeable battery 23 provided in a plurality of mobile devices 5 is the same. In contrast, in a mobile device 5' in accordance with a fourth embodiment, a user sets in advance a priority order in which to start recharging respective mobile devices 5'.

Figure 14:
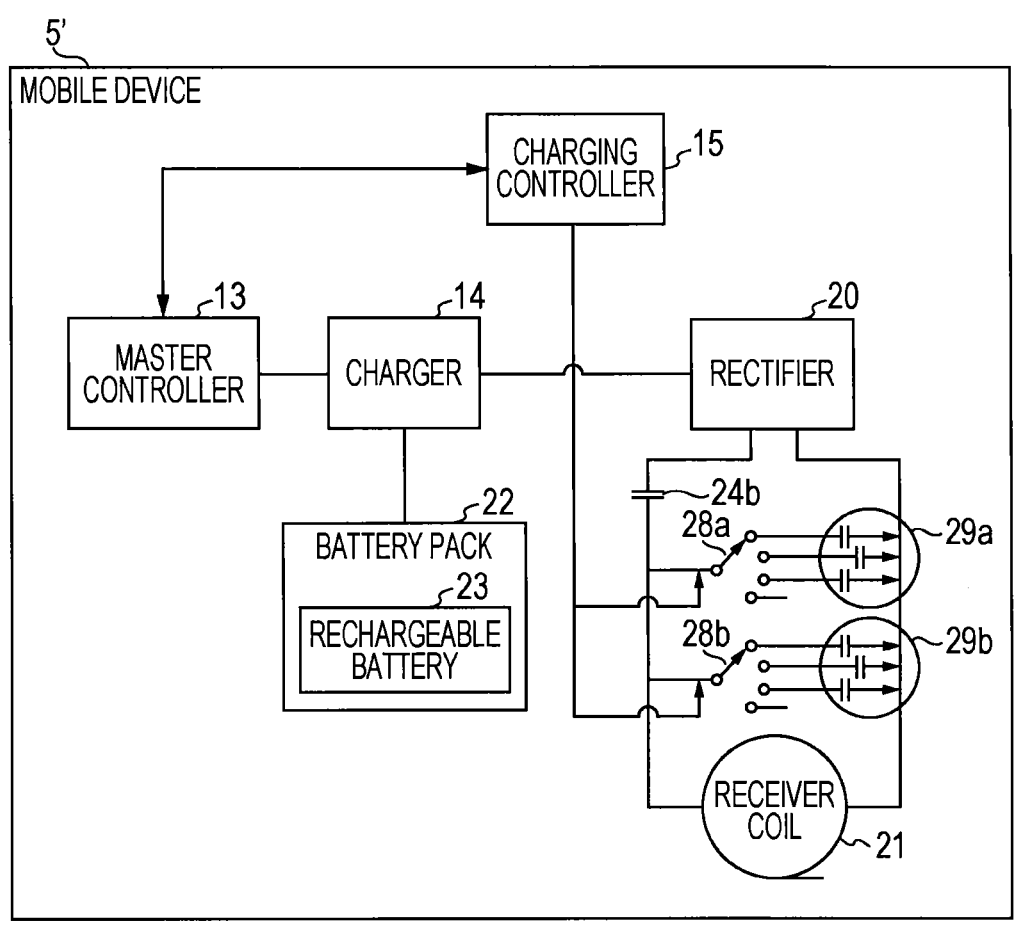
FIG. 14 is a block diagram illustrating an exemplary detailed internal configuration of a mobile device in a fourth embodiment of the present disclosure.

FIG. 14 is a block diagram illustrating an exemplary detailed internal configuration of a mobile device 5'.

The mobile device 5' is provided with charge level-dependent capacitor group 29a for informing the charge pad 6 of the charge level of the rechargeable battery 23, and a priority order-dependent capacitor group 29b for informing the charge pad 6 of a recharge priority order set by the user. The charge level-dependent capacitor group 29a and the priority order-dependent capacitor group 29b are disposed in parallel with respect to the receiver coil 21, and can be connected to or disconnected from the rectifier 20 of the receiver coil 21 in parallel due to respective switches 28a and 28b toggling which capacitor to connect.

FIGS. 15A and 15B are explanatory diagrams illustrating, in table form, associative relationships between charge levels of the rechargeable battery 23 and recharge priority order settings versus states of the switch 28a, respectively. FIG. 15A illustrates exemplary states of capacitors connected or disconnected by the switch 28a depending on the charge level of the rechargeable battery 23. FIG. 15B illustrate exemplary states of capacitors connected or disconnected by the switch 28b due to a priority order for recharging mobile devices 5' being set.

As illustrated in FIG. 15A, if the charge level of the rechargeable battery 23 is equal to or greater than 90%, the switch 28a is disconnected from all capacitors included in the charge level-dependent capacitor group 29a. However, if the charge level of the rechargeable battery 23 decreases to 80-89%, the switch 28a connects to a capacitor having a capacitance of 10 nF. Similarly, if the charge level of the rechargeable battery 23 decreases to 60-79%, the switch 28a connects to a capacitor having a capacitance of 20 nF, and if the charge level of the rechargeable battery 23 decreases to less than 60%, the switch 28a connects to a capacitor having a capacitance of 30 nF.

As illustrated in FIG. 15B, the switch 28b is disconnected from all capacitors included in the priority order-dependent capacitor group 29b in the case where a priority order is not set. However, if the priority order is set to "1" by the user, the switch 28a connects to a capacitor having a capacitance of 8 nF. Similarly, if the priority order is set to "2", the switch 28a connects to a capacitor having a capacitance of 5 nF, and if the priority order is set to "3", the switch 28a connects to a capacitor having a capacitance of 3 nF.

According to a mobile device 5' in accordance with the fourth embodiment described above, a charge level-dependent capacitor group 29a in which capacitors are toggled depending on the charge level of the rechargeable battery 23, and a priority order-dependent capacitor group 29b in which capacitors are toggled by a recharge priority order, are disposed in parallel to the receiver coil 21 and housed inside a mobile device 5'. For this reason, switches 28a and 28b are toggled depending on the priority order and charge level in each of a plurality of mobile devices 5. When the charging controller 15 applies switching control to the switches 28a and 28b in this way, the charge pad 6 conducts a process similar to the process illustrated in FIG. 13. According to this process, the transmitter coil 36 can be moved and recharging can be started in order starting from the device with the lowest charge level of the rechargeable battery 23 and additionally with the highest priority set by the user.

5-1. First Modification

Although a configuration and process that charge a rechargeable battery 23 inside a battery pack 22 inserted into a mobile device 2 or 5 are described in the first through fourth embodiments discussed above, part of the configuration illustrated as a mobile device 2 or 5 may be internally built into a battery pack.

Figure 16:
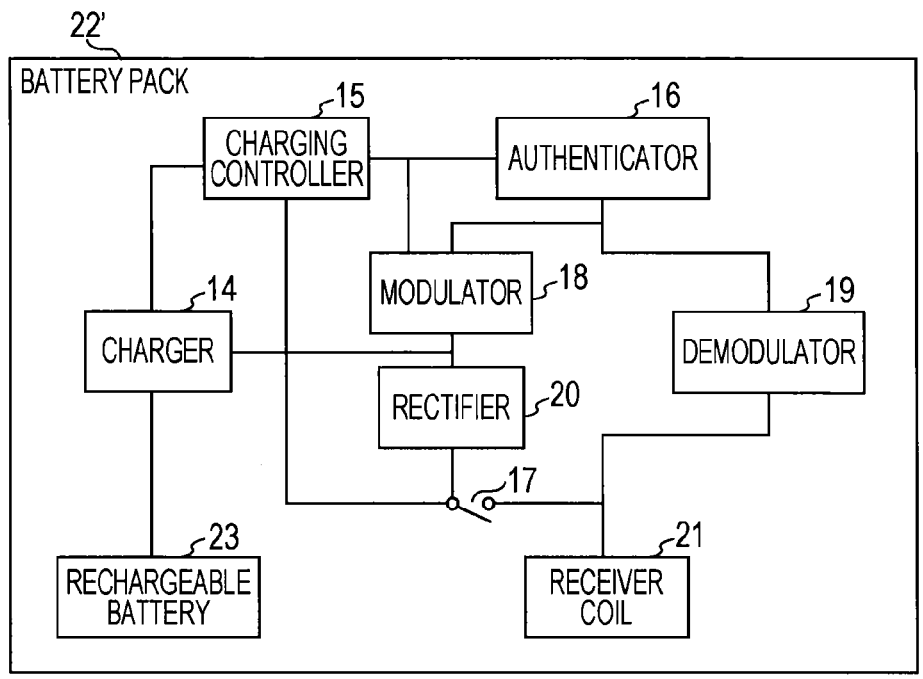
FIG. 16 is a block diagram illustrating an exemplary internal configuration of a battery pack provided with a rechargeable battery in another embodiment of the present disclosure.
Figure 17:
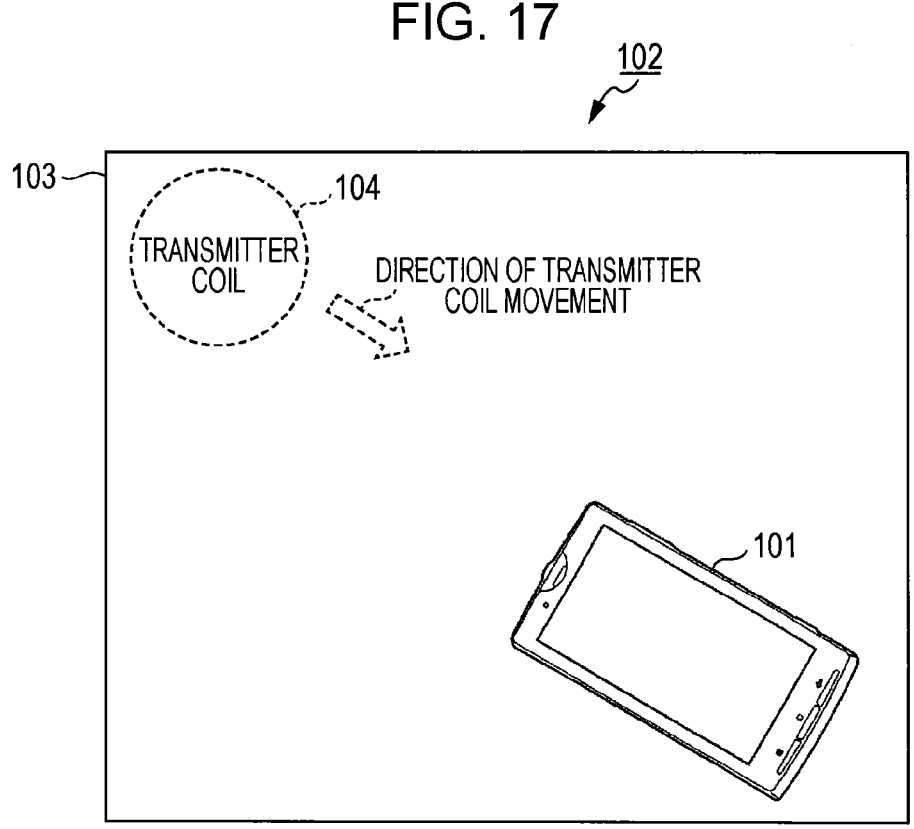
FIG. 17 is an explanatory diagram illustrating how a conventional charging apparatus charges a plurality of mobile devices.

FIG. 16 illustrates an exemplary internal configuration of a battery pack 22' provided with a rechargeable battery 23. Note that in FIG. 16, like symbols are given to parts already described in embodiments discussed above, and detailed description thereof is reduced or omitted.

The battery pack 22' is provided with the components of a mobile device 2 or mobile device 5 discussed above other than the display unit 10, the input unit 11, the memory 12, and the master controller 13. For this reason, it is possible for the battery pack 22' and a charge pad 3 to communicate with each other and charge the rechargeable battery 23, even if the battery pack 22' is placed on the receptacle 35 by itself. Also, even if quiescent power drain of the battery pack 22' drains power stored in the rechargeable battery 23, it is possible to rapidly charge the rechargeable battery 23 by control of the charging controller 15 when the charge level of the rechargeable battery 23 becomes less than a threshold value.

5-2. Second Modification

Also, although a configuration and process that recharge a once-charged rechargeable battery 23 in the case where its charge level drops to less than a threshold value were described in the first through fourth embodiments discussed above, a charge order may be determined for a plurality of mobile devices 2, 5, or 5' placed on a charge pad 3, even if charging for the first time. At this point, connection to a capacitor may be appropriately modified by operational input from the user or by the charge level of the rechargeable battery 23.

Also, an example was described in which the configuration of the switch 17 involves combining a capacitor 24a and a field-effect transistor 25, and in which the switch 26 toggles capacitors 27a to 27c. However, the configurations of the switches 17 and 26 may also be composed of a single or a plurality of capacitors connected in series to the receiver coil 21 and the capacitor 24a. Even if configured in this way, the charging controller 15 is still able to control connection and disconnection of a capacitor with the receiver coil 21 with a control signal supplied to a capacitor.

Also, a modification of the switches 17 and 26 may involve providing a light emitter whereby a mobile device 2 emits light and transmits a charging start signal, and a light receiver whereby a charge pad 3 receives an optical signal. Additionally, it may be configured such that instructions for starting or stopping charging are issued by the mobile device 2 emitting light toward the charge pad 3.

Also, although an example of using a lithium-ion battery was described for the rechargeable battery 23, other types of rechargeable batteries such as nickel-cadmium batteries and nickel-metal hydride batteries may also be used.

Also, in the second embodiment discussed above, it was configured such that charging is started by prioritizing a mobile device with a low charge level after confirming the charge level in each of a plurality of mobile devices. However, the charge order may be changed by not just the charge level of the rechargeable battery 23, but also by a priority order set in advance by the user. For example, it may be configured such that if the user taps the case of a mobile device placed on a charge pad 3 prior to charging, the type of the capacitors 27a to 27c connected to the switch 26 is changed to match the number of taps. In so doing, it becomes possible to charge by prioritizing a mobile device 5 that emits a stronger signal from among a plurality of mobile devices 5. Also, when recharging, the priority order may be taken to be the order of smallest capacitance of the capacitor connected to the receiver coil 21.

It is also possible to change to an arbitrary capacitance by making the capacitance of a capacitor variable.

Also, although a resonant circuit in which a receiver coil and a capacitor are connected in parallel is configured in the embodiments discussed above, a resonant circuit may be configured in which a coil and a capacitor are connected in series, or alternatively, in a combination of serial connections and parallel connections.

Also, the series of processes in the embodiments discussed above may be executed in hardware, but may also be executed in software. In the case of executing the series of processes in software, a program constituting such software is executable by a computer built into special-purpose hardware, or a computer on which programs for executing various functions are installed. For example, programs constituting desired software may be installed and executed on a general-purpose personal computer.

Also, a recording medium recording the program code of software that realizes the functions of an embodiment discussed above may be supplied to a system or apparatus. Obviously, functions may also be realized by a computer (or CPU or other control apparatus) in such a system or apparatus reading out and executing program code stored in a recording medium.

A flexible disk, hard disk, optical disc, magneto-optical disc, CD-ROM, CD-R, magnetic tape, non-volatile memory card, or ROM, for example, may be used as the recording medium for supplying program code in such cases.

Also, the functions of an embodiment discussed above may be realized by executing program code read out by a computer. Moreover, all or part of the actual processing may be conducted by an OS operating on the computer, on the basis of instructions from such program code, including cases where the functions of an embodiment discussed above are realized by such processing.

Also, the present disclosure is not limited to the embodiments discussed above, and obviously various other applications and modifications may be obtained without departing from the principal matter of the disclosure described by the claims. In other words, it is to be understood as obvious by persons skilled in the art that various alterations, combinations, and other embodiments may occur depending on design or other factors insofar as they are within the scope of the claims or their equivalents.

Furthermore, the present disclosure may also take configurations like the following.

According to an exemplary charging device embodiment, the device includes a receptacle upon which a plurality of mobile devices that issue charge order instructions are placed, each of the plurality of the mobile devices includes a rechargeable battery, a receiver coil that receives AC power, a rectifier that rectifies the AC power into DC power, a plurality of capacitors disposed between the receiver coil and the rectifier, and a switch that selectably connects or disconnects the receiver coil one or more of the capacitors;

a transmitter coil that moves on a plane parallel to the receptacle and wirelessly transmits AC power to a selected mobile device of the plurality of mobile devices placed on the receptacle; and a controller that determines a mobile charge order of the plurality of mobile devices based on capacitances of capacitors connected to respective receiver coils of the plurality of mobile devices, and controls a movement of the transmitter coil to a predetermined location in the receptacle on the basis of the mobile charge order so as to charge the rechargeable battery of the selected mobile device.

According to one aspect of the embodiment,
the controller changes the mobile charge order when a charge level of the selected mobile device reaches a predetermined threshold and another mobile device has a charge level lower than the predetermined threshold.

According to another aspect
the controller continues charging of the selected mobile device when no other mobile device has a charge level lower than the predetermined threshold.

According to another aspect
the controller controls charging of a first of two mobile devices that have a same charge level, the first of two mobile devices having a higher priority than the other of the two mobile devices.

According to another aspect
the transmitter coil is configured to move to and charge a nearest of two mobile devices that have a same charge level.

According to a method embodiment for charging a selected mobile device, the method includes detecting respective positions on a receptacle of a plurality of mobile devices that issue charge order instructions, each of the plurality of mobile devices includes a rechargeable battery, a receiver coil that receives AC power, a rectifier that rectifies the AC power into DC power, a plurality of capacitors disposed between the receiver coil and the rectifier, and a switch that selectably connects or disconnects the receiver coil one or more of the capacitors;

comparing charge order instructions from the plurality of mobile devices and determining a selected mobile device with a lowest charge, the selected mobile device being one of the plurality of mobile devices;

moving a transmitter coil to the selected mobile device; and charging the selected mobile device to a predetermined charge threshold.

According to one aspect of the method, the method further includes repeating the comparing, moving and charging steps for another mobile device of the plurality of mobile devices when the another mobile device has a charge level lower than the predetermined threshold.

According to another aspect, the method further includes
continuing the charging of the selected mobile device when no other mobile device has a charge level lower than the predetermined threshold.

According to another aspect, the method further includes
determining that two of the mobile devices have a same charge level; and
charging a first of the two mobile devices that has an assigned higher priority.

According to another aspect, the method further includes
determining that two of the mobile devices have a same charge level;
moving the transmitter coil to a nearest of the two mobile devices; and
charging the nearest of the two mobile devices.

According to a mobile device embodiment, the device includes
a rechargeable battery;
a receiver coil that outputs AC power received from a charging apparatus that wirelessly charges the rechargeable battery;
a rectifier that rectifies the AC power output by the receiver coil into DC power;
a capacitor that is switchably connected between the receiver coil and the rectifier;
a charger that charges the rechargeable battery with the DC power rectified by the rectifier, and measures the charge level of the rechargeable battery;
a switch that selectably connects or disconnects the receiver coil and the capacitor; and a charging controller that controllably operates the switch to change a capacitance level of the mobile device by disconnecting the capacitor from the receiver coil when the charge level of the rechargeable battery is equal to or greater than a predetermined threshold value, and connects the capacitor to the receiver coil with the switch when the charge level of the rechargeable battery is less than the threshold value.

According to one aspect of the embodiment, the device further includes a second capacitor, wherein the charging controller operates the switch to connect the second capacitor to the receiver coil and disconnect the first capacitor from the receiver coil so as to change the capacitance level of the mobile device.

According to another aspect of the embodiment, the device further includes a third capacitor, wherein the charging controller operates the switch to connect the third capacitor to further change the capacitance level of the mobile device, the switch having a first state that is not connected to a capacitor and produces a capacitance level that indicates a first priority setting for charging the mobile device;

the switch having a second state that is connected to the capacitor and produces a second capacitance level that indicates a second priority setting for charging the mobile device;

the switch having a third state that is connected to a second capacitor and produces a third capacitance level that indicates a third priority setting for charging the mobile device; and the switch having a fourth state that is connected to a third capacitor and produces a second capacitance level that indicates a fourth priority setting for charging the mobile device.

According to another aspect of the embodiment, the device further includes a second capacitor, wherein the charging controller operates the switch to connect the second capacitor from the receiver coil and disconnect the first capacitor to the receiver coil so as to change the capacitance of the mobile device; and a second switch that is controlled by the charging controller to switchably connect at least an other capacitor, the other capacitor changing the capacitance level of the mobile device along with at least one of the first capacitor and the second capacitor when connected to the receiver coil.

REFERENCE SIGNS LIST

1: wireless charging system
2: mobile device
3: charge pad
4: AC adapter
5, 5': mobile device
5A to 5C: mobile devices
6: charge pad
10: display unit
11: input unit
12: memory
13: master controller
14: charger
15: charging controller
16: authenticator
17: switch
18: modulator
19: demodulator
20: rectifier
21: receiver coil
22: battery pack
22': battery pack
23: rechargeable battery
24a, 24b: capacitor
25: field-effect transistor
26: switch
27: capacitor
27a to 27c: capacitors
28a, 28b: switch
29a: charge level-dependent capacitor group
29b: priority order-dependent capacitor group
31: notifier
32: notification driver
33: controller
34: position detecting coil
34a: detection coils
35: receptacle
36: transmitter coil
37: coil mover
38: authenticator
39: demodulator
40: coil driver
41: modulator
42: amplitude determiner
43: memory

The invention claimed is:

1. A charging device comprising:
a receptacle upon which a plurality of mobile devices that issue charge order instructions are placed, each of the plurality of the mobile devices includes a rechargeable battery, a receiver coil that receives AC power, a rectifier that rectifies the AC power into DC power, a plurality of capacitors disposed between the receiver coil and the rectifier, and a switch that selectably connects or disconnects the receiver coil one or more of the capacitors;
a transmitter coil that moves on a plane parallel to the receptacle and wirelessly transmits AC power to a selected mobile device of the plurality of mobile devices placed on the receptacle; and
a controller that determines a mobile charge order of the plurality of mobile devices based on capacitances of capacitors connected to respective receiver coils of the plurality of mobile devices, and controls a movement of the transmitter coil to a predetermined location in the receptacle on the basis of the mobile charge order so as to charge the rechargeable battery of the selected mobile device.

2. The charging device of claim 1, wherein
said controller changes the mobile charge order when a charge level of the selected mobile device reaches a predetermined threshold and another mobile device has a charge level lower than said predetermined threshold.

3. The charging device of claim 2, wherein
said controller continues charging of the selected mobile device when no other mobile device has a charge level lower than the predetermined threshold.

4. The charging device of claim 2, wherein
said controller controls charging of a first of two mobile devices that have a same charge level, said first of two mobile devices having a higher priority than the other of the two mobile devices.

5. The charging device of claim 2, wherein
said transmitter coil is configured to move to and charge a nearest of two mobile devices that have a same charge level.

6. A method for charging a selected mobile device, comprising:
detecting respective positions on a receptacle of a plurality of mobile devices that issue charge order instructions, each of said plurality of mobile devices includes a rechargeable battery, a receiver coil that receives AC power, a rectifier that rectifies the AC power into DC power, a plurality of capacitors connected between the receiver coil and the rectifier, and a switch that selectably connects or disconnects the receiver coil to one or more of the capacitors;

comparing charge order instructions from the plurality of mobile devices and determining a selected mobile device with a lowest charge based on capacitances of the plurality of capacitors that are connected to the receiver coil, said selected mobile device being one of the plurality of mobile devices;

moving a transmitter coil to the selected mobile device; and charging the selected mobile device to a predetermined charge threshold.

7. The method of claim 6, further comprising:

repeating said comparing, moving and charging steps for another mobile device of the plurality of mobile devices when said another mobile device has a charge level lower than said predetermined threshold.

8. The method of claim 7, further comprising:

continuing said charging of the selected mobile device when no other mobile device has a charge level lower than the predetermined threshold.

9. The method of claim 6, further comprising:

determining that two of the mobile devices have a same charge level; and charging a first of the two mobile devices that has an assigned higher priority.

10. The method of claim 6, further comprising:

determining that two of the mobile devices have a same charge level;

moving the transmitter coil to a nearest of the two mobile devices; and charging the nearest of the two mobile devices.

11. A mobile device comprising:

a rechargeable battery;

a receiver coil that outputs AC power received from a charging apparatus that wirelessly charges the rechargeable battery;

a rectifier that rectifies the AC power output by the receiver coil into DC power;

a capacitor that is switchably connected between the receiver coil and the rectifier;

a charger that charges the rechargeable battery with the DC power rectified by the rectifier, and measures the charge level of the rechargeable battery;

a switch that selectably connects or disconnects the receiver coil and the capacitor; and a charging controller that controllably operates the switch to change a capacitance level of the mobile device by disconnecting the capacitor from the receiver coil when the charge level of the rechargeable battery is equal to or greater than a predetermined threshold value, and connects the capacitor to the receiver coil with the switch when the charge level of the rechargeable battery is less than the threshold value.

12. The mobile device of claim 11, further comprising:

a second capacitor, wherein said charging controller operates the switch to connect the second capacitor to the receiver coil and disconnect the first capacitor from the receiver coil so as to change the capacitance level of the mobile device.

13. The mobile device of claim 12, further comprising:

a third capacitor, wherein said charging controller operates the switch to connect the third capacitor to further change the capacitance level of the mobile device, the switch having a first state that is not connected to a capacitor and produces a capacitance level that indicates a first priority setting for charging the mobile device;

the switch having a second state that is connected to the capacitor and produces a second capacitance level that indicates a second priority setting for charging the mobile device;

the switch having a third state that is connected to a second capacitor and produces a third capacitance level that indicates a third priority setting for charging the mobile device; and the switch having a fourth state that is connected to a third capacitor and produces a second capacitance level that indicates a fourth priority setting for charging the mobile device.

14. The mobile device of claim 11, further comprising:

a second capacitor, wherein said charging controller operates the switch to connect the second capacitor from the receiver coil and disconnect the first capacitor to the receiver coil so as to change the capacitance of the mobile device; and a second switch that is controlled by the charging controller to switchably connect at least an other capacitor, said other capacitor changing the capacitance level of the mobile device along with at least one of the first capacitor and the second capacitor when connected to the receiver coil.

* * * * *